Nov. 29, 1960   J. R. SHARPSTEEN, JR., ET AL   2,962,425
METHOD FOR ANALYZING MATERIALS
Filed Aug. 28, 1958   3 Sheets-Sheet 1

INVENTORS
JAY RANDOLPH SHARPSTEEN
HAROLD A. SCHERAGA
JULIAN SCOTT BUTTERWORTH
BY
ATTORNEY

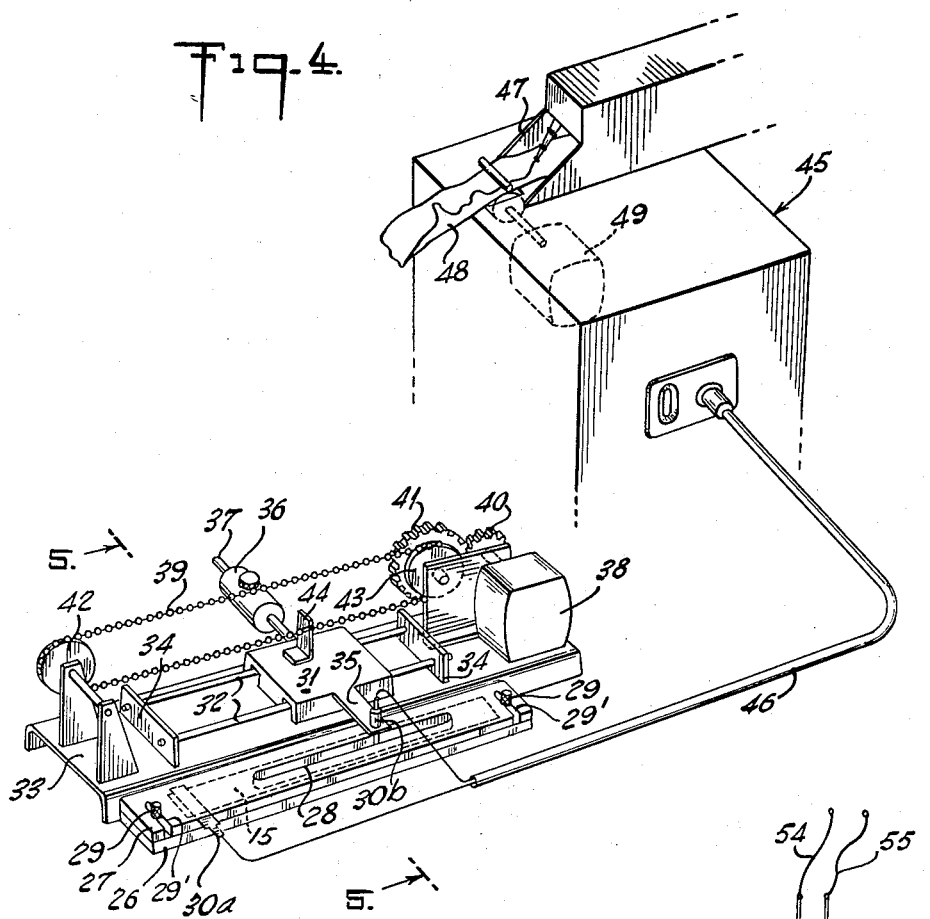
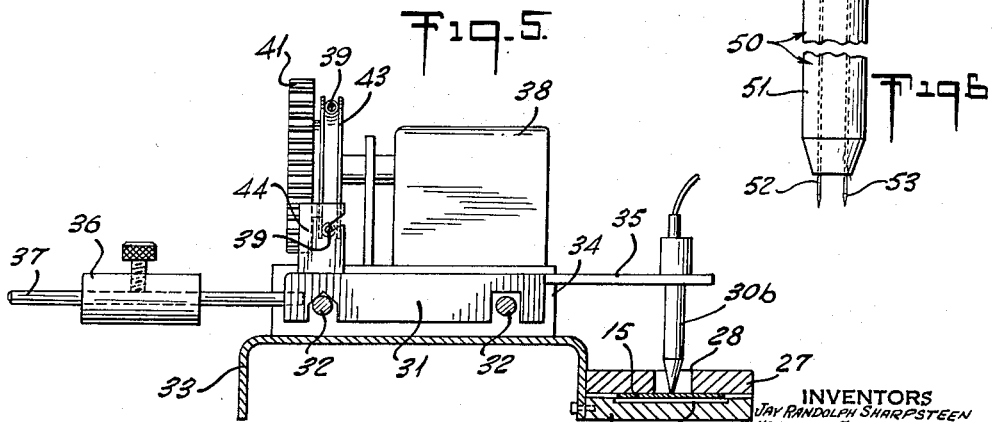

United States Patent Office 2,962,425
Patented Nov. 29, 1960

2,962,425

METHOD FOR ANALYZING MATERIALS

Jay Randolph Sharpsteen, Jr., Monrovia, Calif., and Harold A. Scheraga, Ithaca, and Julian Scott Butterworth, New York, N.Y., assignors to Cambridge Instrument Company, Inc., New York, N.Y., a corporation of New York Filed Aug. 28, 1958, Ser. No. 757,814

16 Claims. (Cl. 204—1)

This invention relates to the analysis of materials carried by supporting media and more specifically to a novel and improved method and apparatus for treating and scanning materials, particularly those separated by chromatographic, electrophoretic and other similar processes.

The separation and purification of materials and their analysis constitutes one of the more difficult problems in chemical research, development and manufacture. Of the various known procedures, chromatography, electrophoresis and other procedures utilizing differences in particle characteristics for the separation of materials are generally considered the most useful and important procedures for analyzing materials. These procedures involve the separation of the materials on a suitable carrier or suporting media such as a liquid, a gelatin or gelatin-like body, and porous bodies including paper and other similar materials.

The separation or purification of materials to be analyzed forms, in effect, only the first step in the analysis, since the separated materials must be detected and measured to afford both qualitative and quantitative information. Heretofore, detection and measuring procedures have involved optical techniques with limited resolution and resultant accuracies dependent upon the treatment of the material after separation to render the separated portions visible. The usual procedure involves the application of appropriate dyes requiring extremely careful control of color, intensity and method of application to the material under test. It has been found that even with the exercise of a high degree of control in performing the dying process, satisfactory results are not always attainable. Moreover, the information obtainable from a dyed record is seriously limited and the limited resolution of optical scanning means further aggravates the problem. Another difficulty with prior procedures resides in the use of an absorbent carrier for the separated and dyed materials since variations in the carrier will produce corresponding variations and therefore errors in the resultant dyed record.

This invention provides a novel and improved method and apparatus for analyzing separated and purified materials which may be accomplished quickly and easily and avoids the limitations and errors encountered by prior systems including the limited resolution of optical systems, the extended time requirements for treatment and the difficulty in effecting a uniform mode of treatment.

While the method and apparatus for attaining the objects of this invention may be used for the detection and measurement of materials separated by any suitable means on a supporting media, for the purpose of this application electrophoretic separation of materials and their detection and measurement will be described.

Electrophoresis involves the phenomenon in which charged particles in a conductive liquid will migrate in an electric field. One procedure utilizes a liquid cell in which the material to be separated is introduced. Upon the application of a potential to the cell, particles of the material will migrate at different rates of speed determined by their electrical and physical characteristics and congregate in discrete groups. The relative positions of these groups and the concentrations of particles in each group have been measured, with limited accuracy, by scanning them by optical means.

Another prior system utilizes an absorbent carrier medium saturated with a buffer solution of known pH. A predetermined quantity of the material to be tested is applied to the medium and a potential is applied thereto. The flow of current through the medium effects migration of the particles in much the same manner as in the case of the liquid cell. This operation is carried on for a predetermined period of time, whereupon the carrier or record is dyed with an appropriate material such as bromphenol blue to locate the various groups of particles and enable the record to be analyzed optically.

The foregoing systems for electrophoretic separation and purification of materials have been and are being used quite etxensively for many purposes including the analysis of human blood and blood serum, as they produce useful results notwithstanding the disadvantages enumerated above, including poor resolution, the difficulty of preparing and dying the electrophoretic record and the extended period of time for treating and analyzing or scanning the record by optical means.

A more precise and reproducible method for analyzing materials on supporting media involves an electro-scanning technique. This method of scanning is accomplished by securing a fixed electrode to the supporting medium for the material and moving a second electrode over the material, the supporting medium and material carried thereby being saturated with a conductive solution. The movement of one electrode over the separated material has been found to generate a potential between the electrodes varying in accordance with the concentration of material at different parts of the carrier. By connecting the two electrodes to an appropriate indicator or recorder, a graphic record of the generated potentials can be produced. In this way a material separated into groups of like particles by electrophoresis or other process can be accurately and quickly analyzed to obtain both qualitative and quantitative information.

While this scanning procedure offers considerably greater resolution and accuracy in the analysis of separated materials than that obtainable with prior systems involving the use of optical devices, highly sensitive amplifying and recording equipment is necessary in order to obtain records having adequate amplitudes. The need for high gain amplifiers often results in the introduction of noise or background signals which may interfere with the proper analysis of the record and, when noise is present for one reason or another, areas of low particle concentration may not produce a signal of sufficient magnitude to permit its detection above the background noise level.

Another object of the invention therefore resides in the provision of an improved method and apparatus for treating materials and electrically scanning the treated material to produce vastly improved signal-to-noise ratios with attendant improvements in both resolution and accuracy.

Another object of the invention resides in the provision of a novel and improved process for the treatment of separated or purified materials on a supporting medium to emphasize selected particle groups and enhance the determination of their concentrations during the electro-scanning operation, thus further improving the resolution of the system and affording a more complete and accurate qualitative and quantitative analysis of the material being tested.

A further object of the invention resides in the provision of an improved electro-scanning method and apparatus wherein the material forming the electrodes and the material treatment are coordinated to secure further improvements in efficiency, accuracy and resolution.

A still further object of the invention resides in the provision of novel and improved electro-scanning method and apparatus for analyzing materials.

The above and other objects of the invention will become more apparent from the following description and accompanying drawings forming part of this application.

In the drawings:

Figures 1 (a) through 1 (h) illustrate diagrammatically the steps of a process in accordance with one embodiment of the invention for separating a material on a carrier strip, treating the separated material, and electro-scanning the treated material;

Figure 4 is a diagrammatic view in perspective of one form of apparatus that may be utilized in performing the electro-scanning operation;

Figure 5 is a cross sectional view of Figure 4 taken along the line 5—5 thereof; and Figure 6 is a cross sectional view of a modified embodiment of the invention.

Figure 1:
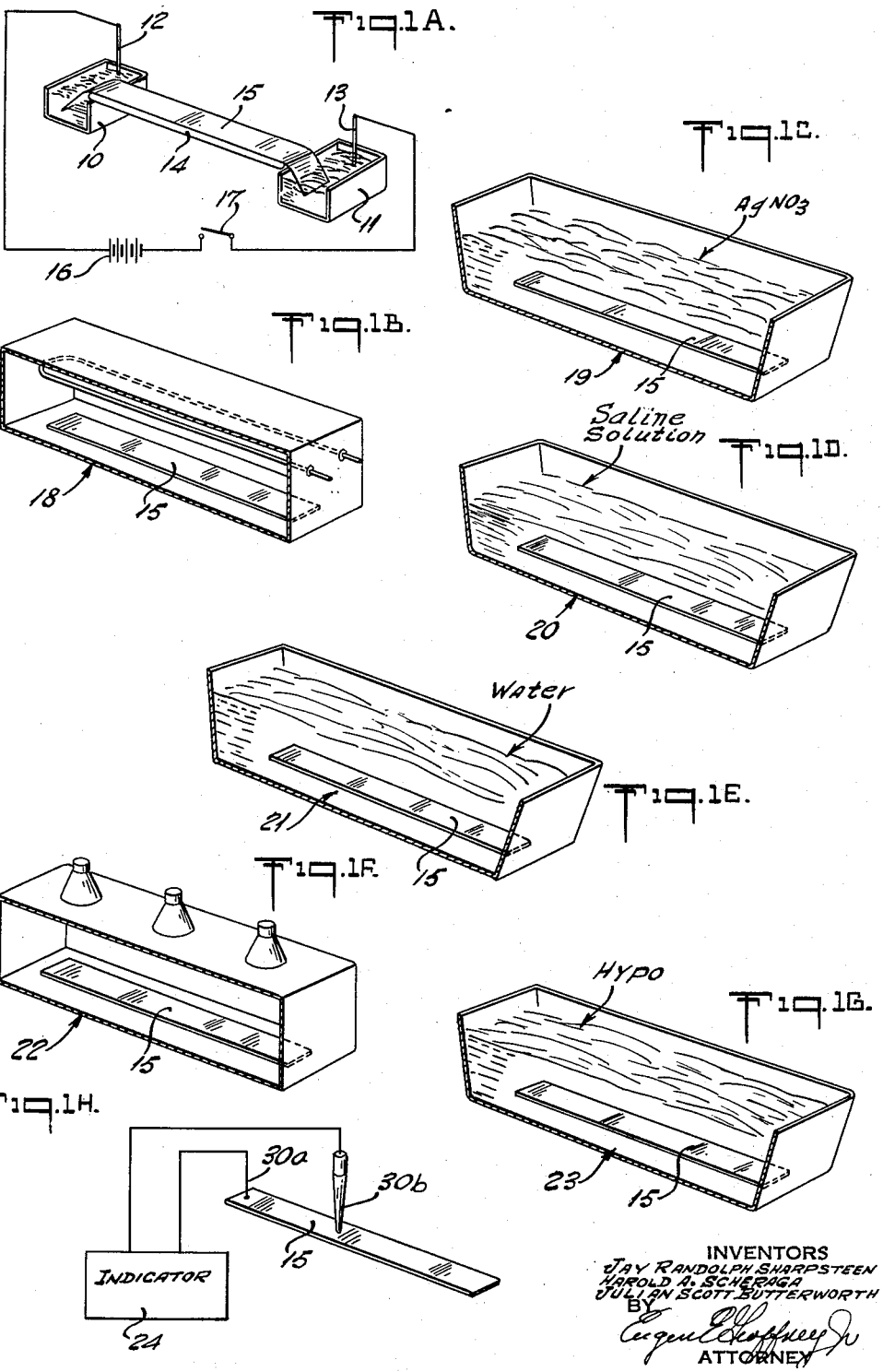

Operation of the electro-scanning technique for analyzing separated materials saturated with a conductive solution is believed to involve an electrochemical reaction between the saturated material and the scanning electrodes, since a measurable voltage is generated between the electrodes which varies with the particle concentration and is unaffected by the resistance of the carrier and the material thereon. For instance, if an electrode is electrically connected to the carrier or the material carried thereby and a second electrode is moved along and in contact with such particle groups, potentials are generated which vary with the nature of the particles and the magnitude of the particle concentrations. In this way highly accurate determinations may be made of the nature of the particles from their relative positions, particle concentration and heterogeneity of such concentrations.

An electrochemical cell for the generation of a potential comprises two interconnected half cells, with each half cell containing one electrode. In electro-scanning electrophoretic records, one electrode may be secured to the carrier medium at a point substantially separated from all of the particle groups whose concentrations are to be measured. This electrode is believed to form, with the liquid or electrolyte on the carrier, a first electrochemical half cell. The second, or movable electrode, which is drawn over the separated material appears to complete the second electrochemical half cell, and the two half cells being connected through the electrolyte generate a potential. In accordance with the electrochemical half-cell theory, the potential generated between the electrodes will be a logarithmic function of the concentrations of the electrolytes at the electrodes. In the instant case, since the potential between the two electrodes varies, as the movable electrode is guided over the separated material, the movable electrode must be subjected to variable chemical or electrochemical conditions. These variable conditions can be explained in terms of differences in ion concentrations which in turn would be a function of the magnitude of the charged particle concentration at any given point on the supported material being analyzed. Furthermore, actual tests have indicated that maximum resolution is attainable by the use of a movable electrode having a point or line contact with the material being analyzed and this observation supports the electrochemical cell theory. Accordingly, and for purposes of this application, the separated material on a carrier and saturated with a conductive solution will be considered as forming a multiplicity of individual half cells which are successively contacted by the movable electrode in the electro-scanning operation.

While it is understood that the invention applies to the treatment and scanning of any material appropriately supported and which, when saturated with a conductive solution forms charged particles, one procedure involves the use of a strip absorbant paper saturated with a conductive solution. The material to be analyzed is applied to the strip and is separated by electrophoresis whereupon one electrode is applied to the strip and the second electrode is moved lengthwise of the strip. In the following description the reference to strip is intended to comprehend any suitable carrier medium.

More efficient and improved electrochemical reaction between the electrodes and the material being analyzed has been obtained in accordance with the invention by treating the material with cations and anions either organic or inorganic. Salts of metals have been found to produce particularly good results. It is known, for instance, that certain materials, when saturated by a conductive solution, form charged particles and often have affinities for certain other substances. It has been found that in the treatment of charged particles to cause ions to become attached thereto, materially increased voltages will be generated by the half cell of which it forms a part. Furthermore in cases, where it may not be possible to link a preferred ion to particles to be detected, an intermediate material or ion may be used that will attach itself to the particle and will in turn have an affinity for the desired metal or other ion.

The foregoing procedure constitutes a very effective and highly important contribution to chemical research since it not only affords means for analyzing separated material with precision and accuracy not heretofore attainable, but also means for analyzing materials that for one reason or another are not readily separable into their different constituents or components. For instance, by the treatment of a material with ions having an affinity for selected particles of the material and then utilizing the electro-scanning technique it is possible to determine its composition both qualitatively and quantitatively without actual separation of the material. For instance, in the case of a mixture of α-casein and lysozyme the former binds cupric ion much more strongly than the latter. Hence selectivity can be achieved with cupric ion.

The foregoing procedure for the treatment and analyzing of materials has been found particularly useful for the analysis of blood and blood serum. When the blood or blood serum is separated into particle groups on a strip of absorbant material by electrophoresis or other process, the separated materials are first denatured by the application of heat and then treated with metal ions. A substantially permanent highly stable record is thus obtained that can be scanned many times without loss of sensitivity.

Figures 1 (a) through 1 (i) are illustrative of one embodiment of the invention for the treatment of blood serum with silver ions. Figure 1a represents the first step in the process which involves the separation of a material on a strip of absorbent paper or the like. One form of apparatus is shown diagrammatically though numerous other structures for this purpose may be used. Briefly, the equipment includes a pair of containers 10 and 11 having electrodes 12 and 13, respectively, immersed in the electrolyte or conductive solution used for the process. An elongated support 14 extends between the containers and supports the electrophoretic strip 15 of absorbent material. The ends of the strip extend into the electrolyte and, in normal practice, it is usually desirable to house the apparatus within a chamber in which the atmosphere is saturated with vapor so that the entire strip 15 remains in a saturated condition. A predetermined quantity of the material to be tested is placed at the center of the strip and a voltage is applied between the electrodes 12 and 13 by a battery or other power supply 16 through a control switch 17. In normal practice the current through the strip 15 is maintained for 10 to 15 hours during which time the particles of the material under test will migrate along the strip. Since different types of particles will migrate at different rates and frequently in different directions along the strip groups of particles will be formed at different positions along the strip. The magnitude of these concentrations and the relative positions of the groups provide both quantitative and qualitative information of the nature and composition of the material being tested as well as heterogeneity of such groups.

Upon completion of the initial separating step as shown in Figure 1a, the strip 15 is removed from the apparatus and immediately placed in an oven 18 as shown in Figure 1b to thoroughly dry the strip. In the case of blood serum, for instance, which is formed of proteins, the drying will fix or denature the protein in the paper so that further movement or migration is halted. The dried strip is then removed from the oven and immersed in a bath 19 of silver nitrate until it becomes thoroughly saturated. During this step, as shown in Figure 1c, the silver ions which have an affinity for proteins will attach themselves selectively to the protein molecules. The saturated strip 15 is then placed in a saline bath 20 as shown in Figure 1d, and then washed in a water bath 21 (Figure 1e).

The paper strip 15 is then exposed to ultraviolet light or sunlight either during or immediately after the washing step (Figure 1e) and this step is represented by the exposure cabinet 22 in Figure 1f. After exposure of the paper to ultraviolet or sunlight for a predetermined period of time, the strip is immersed in a hypo solution 23 (Figure 1g). The strip saturated in hypo is then scanned as shown in Figure 1h by the attachment of an electrode 30a to one end of the paper and moving a second electrode 30b along the length of the strip. An indicator 24 connected to the electrodes 30a and 30b is responsive to the voltage generated between the electrodes and, if desired, a permanent recording may be made of these voltage variations. In scanning a strip treated as outlined above excellent results were obtained with silver and platinum electrodes.

It will be observed that the fixed electrode 30a in this embodiment of the invention is positioned on the strip at a point separated from any material that may be carried by the strip and will contribute a fixed portion of the total measured voltage. The voltage contribution of this fixed half cell will be uniform from one strip to the next and if desired can be readily determined by known procedures. The movable electrode, on the other hand, will encounter large numbers of silver ions and since the fixed half cell contributes a known voltage, the concentration of silver ions at any selected point in the path of the movable electrode can be determined. This will afford means for determining the concentration of the material at such selected point or points. Thus, by preparing a voltage graph of the strip containing a separated material, the separate groups of particles can be detected, their concentrations determined and the movement of each group of particles from the point of application or origin affords information useful in identifying each particle group. Identification of the components of a material may also be aided by selective treatment of the separated materials since it has been found that certain colloids, proteins, and other materials forming charged particles in a conductive solution have greater affinities for certain ions than for others. Thus, by treating particle groups with different ions selected particle concentrations can be emphasized and a particle group that appears to be formed of like particles may be shown to include two or more different types of particles.

An electrophoretic record of blood serum prepared in accordance with the silver nitrate process as described above is illustrated in Figure 2 of the drawings. While a silver nitrate treated strip is useful for purposes of optical analysis inasmuch as the groups of particles are visible, such visibility is not essential to the invention as a graphical voltage record is produced through chemical reaction and has no dependence whatsoever on the visibility of the particle groups. The illustrated record of Figure 2 has considerable correspondence with a conventionally dyed record for optical analysis and it is therefore shown to point out the general nature of material separation. For example, it will be observed that the strip shows essentially five areas of varying density, with the first area at the left being relatively wide, of medium density and including the point of application of the serum which is denoted by the letter P. The next two darkened areas to the right are somewhat lighter than the first area. The fourth area is exceedingly light and almost imperceptible to the eye. The fifth, or last area is exceedingly dark and in the instant case is albumin. The other darkened areas from left to right are gamma globulin, beta globulin, $\alpha_2$ globulin and $\alpha_1$ globulin.

The use of silver nitrate produces a record having an appearance somewhat similar to a conventionally dyed record and would generally offer about the same information if scanned by a conventional optical system. However, in scanning the record treated with silver nitrate, the voltage curve shown in Figure 3 is produced and it will be observed that variations in the concentration of silver ions and therefore protein particles are evident which are not visibly discernible in the record of Figure 2.

More specifically it will be observed that the voltage deflection representing particle concentration of gamma globulin is not uniform in that it has pronounced peak "a" and a second peak "b" the latter being substantially coincident with the point P denoting the place of application of the serum to the strip. The $\beta$, $\alpha_2$ and $\alpha_1$ globulin while appearing as distinct particle concentrations actually form peaks c, d and e of a broad pulse with the $\alpha_2$ peak being better than half the intensity of the $\alpha_1$ peak. It will also be observed that the $\alpha_2$ concentration while appearing to be of a lower magnitude than the gamma concentration is in fact greater. The albumin represented by the peak "f" indicates a concentration only slightly exceeding $\alpha_2$ globulin and yet on the record of Figure 2 albumin appears to have more than twice the density of $\alpha_2$ globulin.

While the amplitude of peak voltages produced in treating and scanning a record, in accordance with the invention illustrates certain deficiencies of the conventional optical technique, the area encompassed by each voltage excursion illustrates still another shortcoming of prior known systems. For instance, a visual inspection of the record of Figure 2 indicates that the percentages of albumin and gamma globulin would be about the same since the albumin stripe is narrow and dark while the gamma globulin stripe is fairly wide but somewhat lighter or less dense. Yet in computing the areas encompassed by the gamma globulin and albumin voltage excursions the former greatly exceeds the latter and would therefore indicate considerably more gamma globulin than albumin in the blood.

Figure 3:
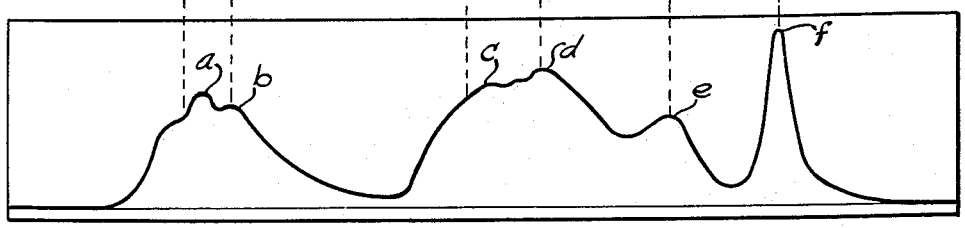
Figure 3 is a voltage graph obtained by scanning the treated record shown in Figure 2 in accordance with the invention.

Another important aspect of the invention is also evidenced by the voltage curve of Figure 3. It is known that blood serum is a highly complex material and yet because of the limitations of prior analyzing systems available for general diagnostic purposes, blood serum has been generally divided into the components set forth above. In the curve of Figure 3, which represents an actual curve produced in accordance with the invention, the only regular and uniform peak is that produced by albumin. The other voltage excursions include numerous irregularities indicative of the presence of other readily detectable substances having specific migration rates. For instance, gamma globulin produces in effect three peaks which tend to signify the presence of three different identifiable substances.

With this invention as described above it is possible to effect a more accurate analysis of a material without encountering the difficult, tedious and time consuming procedures and inaccuracies of known prior processes and further by selective treatment of the material it is possible to emphasize selected components to produce qualitative and quantitative information heretofore difficult if not impossible of attainment except with complicated and expensive techniques requiring highly controlled laboratory conditions.

Figure 2:
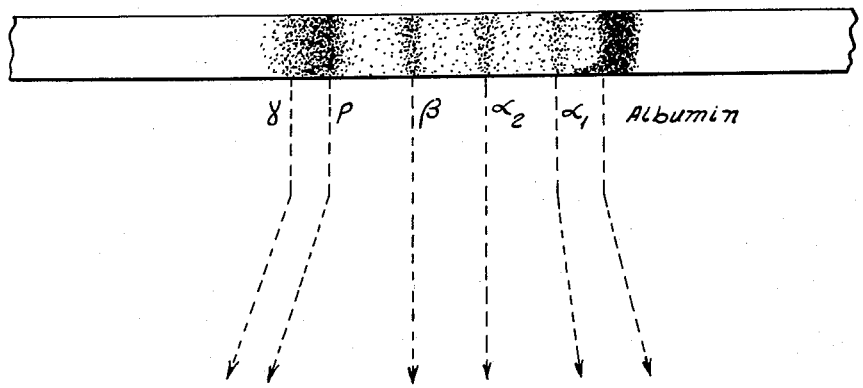
Figure 2 is a plan view of a carrier strip having a separated material thereon and treated in accordance with the invention.

The apparatus for scanning a treated record as shown in Figure 2 to produce the voltage curve of Figure 3 may take any suitable form that will afford the required accuracy, the essential factors being the uniform movement of the electrode along the record and the accuracy of the voltage recorder which should preferably utilize a D.C. amplifier. One form of apparatus for this purpose is diagrammatically illustrated in Figures 4 and 5. The electrophoretic record 15 is held in a stationary position while the movable electrode, denoted herein by the numeral 30b is moved at a constant speed over the record.

More specifically, the scanning apparatus includes a holder for the electrophoretic strip 15 saturated with a conductive solution, the holder comprising a pair of overlying plates 26 and 27 with the plate 27 having an elongated slot 28 to expose a portion of the record 15 for engagement by the electrode 30b and to minimize evaporation of the solution. The two plates are secured together by suitable fastening means such as thumb screws 29 and are preferably made of an insulating material inert to the conductive solution used on the strip 15. The upper plate 27 may also include an electric contactor 30a that is pressed firmly against the strip when the plates 26 and 27 are secured to the other as illustrated. For purposes to be described, the contactor 30a may have essentially a point contact placed in conductive coupling with a selected particle group. The lower plate 26 includes an elongated recess 26' to receive the strip and prevent application of pressure that would compact the strip and modify its characteristics (see Figure 5).

The moving contactor, denoted by the numeral 30b, is supported by a carriage 31 slidably mounted on a pair of guide rails 32. The guide rails 32 are parallel to the slot 28 and may be fastened to the base 33 in any desired manner as by end plates 34. An arm 35 forming part of the carriage 31 supports the contactor 30b in insulating relationship to the carriage 31 and bracket 35. While a pair of guide rails 32 are used for the carriage 31, the carriage is actually pivotally supported by the guide rail farthest from the contactor 30b as viewed in Figure 4 and the pressure of the contactor 30b on the record 10 is controlled by a counterweight 36 adjustably supported on a rod 37 extending from the carriage 31. Translation of the carriage is accomplished by a motor 38 driving a chain 39 through a gear train including gears 40 and 41. The chain is supported by a pair of pulleys 42 and 43 and engages a bracket 44 on the carriage 31. In this way rotation of the motor will propel the carriage at a uniform rate of speed and thereby draw the movable contactor 30b uniformly over the surface of the strip 10.

The fixed contactor 30a and the movable contactor 30b are connected to the recording equipment generally denoted by the numeral 45 by means of electric cable 46. The recorder 45 may include appropriate amplifying equipment, preferably a D.C. amplifier, for amplifying the signal produced between the contactors 30a and 30b and produce an output signal of sufficient magnitude to actuate the recording pen 47. The pen 47 bears on a strip 48 of paper or other material that is moved at a uniform rate of speed beneath the pen by a motor 49.

Inasmuch as recorders such as the recorder 45 are well known in the art, a more detailed description is not deemed necessary.

In many cases it may be desirable to shift the position of the record 15 relative to the electrode 30b and for this purpose the upper plate 27 is fixed to the base 33 and provided with end slots 29' through which the thumb screws 29 extend. In this way, the lower plate 26 and record 15 can be displaced laterally to expose any desired part of strip 15 in slot 28.

Another important aspect of the invention resides in modified scanning techniques that afford still further information and particularly the magnitude of any heterogeneity of individual groups of particles. Determination of heterogeneity provides further detailed analysis of particle groups not possible with known procedures. For instance, it is possible to place one electrode 30a in contact with an albumin or other group and then move the other electrode 30b over the selected group to produce an inverted voltage curve. Further, it is possible to differentiate the curve of Figure 3 by moving the two electrodes, one in advance of the other, over the strip. This will produce a maximum signal where the slope of the voltage change is greatest. In the case of albumin, the curve or deflection $f$ of Figure 3 would be transformed into a double peaked curve since the rate of change of voltage at the peak of the deflection $f$ is zero. In this way, non-uniformity of each half of the albumin particle group can be readily detected and such non-uniformity will afford an indication of the heterogeneity of the albumin particle group. With this evidence and with treatment of the albumin with selected ions detailed material analyses not heretofore possible with known chromatographic procedures, can be accomplished.

One form of apparatus for producing differentiated response curves is illustrated in Figure 6 showing a modified scanning electrode 50. This electrode may be mounted on the apparatus of Figures 4 and 5 in place of the single electrode 30b. It includes a body 51 of insulating material and has a pair of conductive elements 52 and 53 extending therethrough. The lower ends of the elements 52 and 53 are moved over and in contact with the treated record to be analyzed with one element or contact member in advance of the other. Recordation of the voltage generated between the contact members 52 and 53 is effected by connecting them through leads 54 and 55 to the recorder cable 46 as shown in Figure 4 in which case the original electrodes 30a and 30b are not used.

While only certain embodiments of the invention have been illustrated and described, it is understood that modifications, alterations and changes may be made without departing from the true scope and spirit thereof as defined in the appended claims.

What is claimed is:

1. The method of analyzing a material containing at least one constituent on a carrier comprising the steps of treating said material and carrier with a solution containing metal ions having a specific affinity for said constituent to leave a film of said solution on said carrier, placing at least two electrodes in contact with said solution, moving at least one electrode relative to the carrier and in contact with the material, and indicating the voltage generated between the electrodes while moving said one electrode.

2. The method of analyzing a material containing at least one constituent on a carrier comprising the steps of treating said material and carrier with a solution containing metal ions having a strong known affinity for particles of said constituent and leaving part of said solution on said carrier, placing at least two electrodes in contact with said solution, moving at least one electrode relative to the carrier and in contact with the material, and indicating the voltage generated between the electrodes while moving said one electrode.

3. The method according to claim 1 wherein the other of said electrodes is fixed to the carrier and in contact with the solution.

4. The method of analyzing a material containing at least one constituent comprising the steps of coupling ions having a specific affinity for certain particles of said constituent, said coupling being attained by treating said material with a solution containing said ions, placing at least one electrode in contact with said material while moistened with said solution, placing a second electrode in electrolytic circuit with said treated material, moving at least said one electrode relative to and in contact with said material and indicating the voltage generated between said electrodes.

5. The method according to claim 4 wherein the second electrode is fixed and is electrolytically connected to said material by means of said solution.

6. The method of analyzing a material wherein said material forms a plurality of charged particles when moistened with a conductive solution comprising the steps of moistening the material with a solution containing ions having a specific affinity for particles of at least one constituent forming part of said material, coupling ions to each of the first said coupled ions, placing at least two electrodes in electrolytic circuit with said material and said solution, moving at least one of said electrodes relative to and in contact with said material and indicating the voltage generated between the electrodes.

7. The method of analyzing a material supported by a carrier medium and forming charged particles when moistened with a conductive solution comprising the steps of electrophorescing said material to separate at least certain constituents of said material into groups of particles, treating said material and carrier medium with a conductive solution containing ions having a specific affinity for at least one of said groups of particles to cause said ions to be coupled to said selected particles, placing at least two electrodes in contact with said solution, moving an electrode relative to and in contact with said material and indicating the voltage generated between said electrodes.

8. The method according to claim 7 including the step of enhancing ion selectivity for said selected particles by coupling an intermediate particle to said selected particles, said intermediate particles having a greater affinity for said ions than the said selected particles.

9. The method of analyzing a material comprising the steps of applying said material to a carrier moistened with a conductive solution, electrophoresing said material, treating said material and said carrier with a solution containing ions having a specific affinity for certain particles of said material, placing at least two electrodes in electrical contact with said solution retained by said carrier, moving at least one of the electrodes relative to and in contact with said material and indicating the voltage generated between the electrodes during the movement of said one electrode.

10. The method according to claim 9 wherein said carrier constitutes an absorbent strip and wherein said strip and material are moistened with said solution.

11. The method of analyzing materials such as blood, blood serum and the like comprising the steps of electrophoresing said material while on a carrier to separate it into groups of particles having different characteristics, treating said carrier and groups of particles with a conductive solution containing ions to cause said ions to become linked with like particles of said material having a specific affinity for said ions, placing at least two electrodes in electrical contact with said solution retained by said carrier, moving at least one of said electrodes relative to and in contact with said groups of particles and indicating the voltage generated between said electrodes.

12. The method according to claim 11 wherein said ions are linked to said particles by means of an intervening electrically charged particle.

13. The method of analyzing a material containing at least one constituent comprising the steps of treating said material with a solution containing ions having a specific affinity for particles of said constituent to leave at least part of the solution intermixed with said material, placing at least two electrodes in contact with the solution treated material, simultaneously moving said electrodes relative to and in contact with said material in spaced relationship one to the other and indicating the voltage produced between the electrodes.

14. The method according to claim 13 wherein one of said electrodes is moved in advance of the other.

15. The method of analyzing a material containing at least one constituent on a carrier comprising the steps of treating said material and carrier with a solution containing ions having a specific affinity for said material to leave a film of said solution on said material and said carrier, placing electrodes in contact with said solution retained by the carrier, and measuring the voltage produced by the electrodes and ion containing solution between spaced points on said carrier.

16. The method of analyzing a material containing at least one constituent comprising the steps of treating said material with a solution containing ions having a specific affinity for particles of said constituent to leave at least part of the solution on said material, placing at least one electrode in contact with the solution treated material, placing another electrode in electrolytic circuit with said solution treated material, moving at least one of said electrodes relative to and in contact with said material and indicating the voltage produced between the electrodes.

References Cited in the file of this patent

UNITED STATES PATENTS

| | | |
|---|---|---|
| 2,063,992 | Elsey | Dec. 15, 1936 |
| 2,192,404 | Jakosky | Mar. 5, 1940 |
| 2,215,213 | Ellis | Sept. 17, 1940 |
| 2,288,180 | Brengman et al. | June 30, 1942 |
| 2,316,340 | Kohn | Apr. 13, 1943 |
| 2,843,540 | Ressler | July 15, 1958 |